United States Patent
Sakaida et al.

(10) Patent No.: US 12,209,030 B2
(45) Date of Patent: Jan. 28, 2025

(54) SOLID ELECTROLYTE MATERIAL AND BATTERY

(71) Applicant: Panasonic Intellectual Property Management Co., Ltd., Osaka (JP)

(72) Inventors: Masashi Sakaida, Hyogo (JP); Tetsuya Asano, Nara (JP); Akihiro Sakai, Nara (JP); Yusuke Nishio, Osaka (JP); Akinobu Miyazaki, Osaka (JP); Shinya Hasegawa, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1188 days.

(21) Appl. No.: 16/930,439

(22) Filed: Jul. 16, 2020

(65) Prior Publication Data
US 2020/0350622 A1 Nov. 5, 2020

Related U.S. Application Data (63) Continuation of application No. PCT/JP2018/042062, filed on Nov. 14, 2018.

(30) Foreign Application Priority Data

Jan. 26, 2018 (JP) ................. 2018-011536

(51) Int. Cl.
*H01M 10/05* (2010.01)
*C01D 15/04* (2006.01)
(Continued)

(52) U.S. Cl.
CPC .............. *C01F 17/36* (2020.01); *C01D 15/04* (2013.01); *C01G 25/006* (2013.01);
(Continued)

(58) Field of Classification Search
None
See application file for complete search history.

(56) References Cited

U.S. PATENT DOCUMENTS 4,352,869 A 10/1982 Mellors
5,506,073 A 4/1996 Angell et al.
(Continued)

FOREIGN PATENT DOCUMENTS

CN 105254184 1/2016
CN 105680048 A 6/2016
(Continued)

OTHER PUBLICATIONS

"Ternary halides of the A3MX6 Type, V. Synthesis, Crystal Structures, and Sodium Ionic Conductivity of the Ternary Iodides Na3MI6 (M=Sm, Gd—Dy), and of Solid Solution Halides Na3GdVBr6-xIx", Andreas Bohnsack et al., Z. anorg. allg. Chem, 623 (1997), pp. 837-843. (Year: 1997).*

(Continued)

*Primary Examiner* — Maria Laios
*Assistant Examiner* — Angela J Martin
(74) *Attorney, Agent, or Firm* — Rimon P.C.

(57) ABSTRACT

Provide is a solid electrolyte material represented by a composition formula $Li_aY_bM_cX_{6-d}F_d$, where M includes at least one kind selected from the group consisting of metalloid elements and metal elements other than Li and Y; X is at least one kind selected from the group consisting of Cl, Br, and I; $0<a$; $0<b$; $0\leq c$; and $0<d<6$.

16 Claims, 4 Drawing Sheets

(51) Int. Cl.
*C01F 17/36* (2020.01)
*C01G 25/00* (2006.01)
*H01M 10/0525* (2010.01)
*H01M 10/0562* (2010.01)

(52) U.S. Cl.
CPC ... *H01M 10/0525* (2013.01); *H01M 10/0562* (2013.01); *C01P 2006/40* (2013.01); *H01M 2300/008* (2013.01)

(56) References Cited

U.S. PATENT DOCUMENTS

| | | |
|---|---|---|
| 5,714,279 A | 2/1998 | Zajac, Jr. et al. |
| 9,160,034 B2 | 10/2015 | Kato et al. |
| 10,008,735 B2 | 6/2018 | Ohtomo et al. |
| 2004/0151986 A1 | 8/2004 | Park et al. |
| 2011/0045355 A1 | 2/2011 | Ichikawa |
| 2012/0301796 A1 | 11/2012 | Ohtomo et al. |
| 2012/0308900 A1 | 12/2012 | Ogasa |
| 2013/0295464 A1 | 11/2013 | Yanagi et al. |
| 2014/0087270 A1 | 3/2014 | Yoshida |
| 2015/0147659 A1 | 5/2015 | Kato |
| 2016/0103232 A1 | 4/2016 | Ouspenski et al. |
| 2016/0149259 A1 | 5/2016 | Osada et al. |
| 2016/0156064 A1 | 6/2016 | Miyashita et al. |
| 2016/0204467 A1 | 7/2016 | Nogami et al. |
| 2016/0248119 A1 | 8/2016 | Kato |
| 2016/0268630 A1 | 9/2016 | Tsukada et al. |
| 2016/0285078 A1 | 9/2016 | Deschamps et al. |
| 2016/0308210 A1 | 10/2016 | Sakuda et al. |
| 2016/0359193 A1 | 12/2016 | Yi et al. |
| 2017/0040637 A1 | 2/2017 | Ceder et al. |
| 2017/0179481 A1 | 6/2017 | Yamada et al. |
| 2017/0187066 A1 | 6/2017 | Tsujimura et al. |
| 2017/0222257 A1 | 8/2017 | Miyashita et al. |
| 2017/0229734 A1 | 8/2017 | Furukawa et al. |
| 2017/0288281 A1 | 10/2017 | Chiang et al. |
| 2018/0183065 A1 | 6/2018 | Sasaki |
| 2018/0269521 A1 | 9/2018 | Ohtomo et al. |
| 2019/0067736 A1 | 2/2019 | Yoshioka et al. |
| 2019/0088995 A1 | 3/2019 | Asano et al. |
| 2019/0097266 A1 | 3/2019 | Yamamoto et al. |
| 2020/0212481 A1 | 7/2020 | Nagamine et al. |
| 2020/0328454 A1 | 10/2020 | Sakai et al. |
| 2020/0328455 A1 | 10/2020 | Sakai et al. |
| 2020/0328457 A1 | 10/2020 | Sakai et al. |
| 2020/0328460 A1 | 10/2020 | Asano et al. |
| 2020/0328461 A1 | 10/2020 | Asano et al. |
| 2020/0328462 A1 | 10/2020 | Asano et al. |
| 2020/0328464 A1 | 10/2020 | Asano et al. |
| 2020/0328465 A1 | 10/2020 | Sakaida et al. |
| 2020/0328468 A1 | 10/2020 | Sakaida et al. |
| 2020/0328469 A1 | 10/2020 | Asano et al. |
| 2020/0335817 A1 | 10/2020 | Asano et al. |
| 2020/0350615 A1 | 11/2020 | Sakaida et al. |

FOREIGN PATENT DOCUMENTS

| | | | |
|---|---|---|---|
| CN | 108701860 A | | 10/2018 |
| EP | 2916381 B1 | | 6/2016 |
| EP | 3428929 | | 1/2019 |
| EP | 3496202 A1 | | 6/2019 |
| EP | 3736831 A1 | | 11/2020 |
| EP | 3736834 A1 | | 11/2020 |
| EP | 3736899 A1 | | 11/2020 |
| EP | 3745422 A1 | | 12/2020 |
| EP | 3745518 A1 | | 12/2020 |
| IN | 201847045950 A | | 2/2019 |
| JP | S57-132677 A | | 8/1982 |
| JP | H05-306117 A | | 11/1993 |
| JP | H08-171938 A | | 7/1996 |
| JP | H09-293516 A | | 11/1997 |
| JP | 11-238528 A | | 8/1999 |
| JP | 2001-052733 A | | 2/2001 |
| JP | 2004-235155 | | 8/2004 |
| JP | 2006-244734 A | | 9/2006 | |
| JP | 2006244734 | * | 9/2006 | ......... H01M 10/052 |
| JP | 2008-021556 A | | 1/2008 |
| JP | 2011-129312 | | 6/2011 |
| JP | 5076134 B2 | | 11/2012 |
| JP | 2012-246196 A | | 12/2012 |
| JP | 2013-073791 A | | 4/2013 |
| JP | 2013073791 | * | 4/2013 | ............. H01M 4/58 |
| JP | 2015-011901 A | | 1/2015 |
| JP | 2015-032529 A | | 2/2015 |
| JP | 2015-056349 A | | 3/2015 |
| JP | 2016-024874 | | 2/2016 |
| JP | 2016-171067 A | | 9/2016 |
| JP | 2017-059342 A | | 3/2017 |
| JP | 2017-091953 A | | 5/2017 |
| JP | 2017-091955 A | | 5/2017 |
| JP | 2017-117753 A | | 6/2017 |
| JP | 2017-518622 A | | 7/2017 |
| JP | 2017-152324 A | | 8/2017 |
| JP | 6222134 B2 | | 11/2017 |
| JP | 2017-224474 A | | 12/2017 |
| WO | 2011/073798 A2 | | 6/2011 |
| WO | 2015/011937 A1 | | 1/2015 |
| WO | 2015/030052 A1 | | 3/2015 |
| WO | 2015/049986 A1 | | 4/2015 |
| WO | 2017/108105 | | 6/2017 |
| WO | 2017/154766 A1 | | 9/2017 |
| WO | 2017/154922 | | 9/2017 |
| WO | 2018/025582 | | 2/2018 |
| WO | 2019/146218 A1 | | 8/2019 |
| WO | 2019/146219 A1 | | 8/2019 |

OTHER PUBLICATIONS

International Search Report of PCT application No. PCT/JP2018/042062 dated Feb. 19, 2019.
Andreas Bohnsack et al., "The Bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
Yasumasa Tomita et al., "Preparation of Substituted Compounds of Lithium Indium Bromide and Fabrication of All Solid-State battery", Recent Innovations in Chemical Engineering, 2017, 10, 12-17.
English Translation of Chinese Search Report dated Mar. 11, 2023 for the related Chinese Patent Application No. 201880071935.5.
Yasumasa Tomita et al. "Synthesis and Characterization of Lithium Ion Conductors, Li3InBr6 and their Substituted Compounds", <Diffusion and Defect Data—Solid State Data, Pt. A: Defect and Diffusion Forum>, vol. 242-244, pp. 17-26.
Indian Examination Report dated Mar. 28, 2022 for the related Indian Patent Application No. 202047027797.
Indian Examination Report dated Apr. 4, 2022 for the related Indian Patent Application No. 202047027476.
Indian Examination Report dated Jun. 21, 2022 for the related Indian Patent Application No. 202047027487.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.

(56) References Cited

OTHER PUBLICATIONS

International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/046264 dated Mar. 19, 2019.
International Search Report of International Application No. PCT/JP2018/042061 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Yasumasa Tomita et al., "Li ion conductivity of solid electrolyte, Li3—2xMxInBr6 (M = Mg, Ca, Sr, Ba)", Solid State Ionics 174.1-4 (2004): 35-39 (Year: 2004).
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6—xClx," Solid State Ionics 179.21-26 (2008): 867-870. (Year: 2008).
Steiner, H-J., and H. D. Lutz, "Neue schnelle lonenleiter vom Typ MI3 MIIICI6 (Mi = Li, Na, Ag; MIII= In, Y)." Zeitschrift fur anorganische und allgemeine Chemie 613.7 (1992): 26-30 (Year: 1992).
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1—xMxBr6 (M = Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
English Translation of Chinese Search Report dated Dec. 14, 2023 for the related Chinese Patent Application No. 201880081975.8.
"Ternary Halides of the A3MX6 Type. V . Synthesis, Crystal Structures, and Sodium Ionic Conductivity of the Ternary Iodides Na3MI6 (M=Sm, Gd—Dy), and of Solid Solution Halides Na3GdVBr6—xIx", Andreas Bohnsack et al., Z. anorg. allg. Chem., 623 (1997) 837-843 , Nov. 9, 2004.

* cited by examiner

SOLID ELECTROLYTE MATERIAL AND BATTERY

BACKGROUND

1. Technical Field

The present disclosure relates to a solid electrolyte material and a battery.

2. Description of the Related Art

Patent Literature 1 discloses an all-solid battery using a sulfide solid electrolyte.

Non-Patent Literature 1 discloses ion conductivity of a halide solid electrolyte including indium and fluorine.

CITATION LIST

Patent Literature

Patent Literature 1: Japanese Patent Application Publication No. 2011-129312

Non-Patent Literature

Non-Patent Literature 1: Y. Tomita et. al. Recent Innovations in Chemical Engineering, 2017, 10, 12-17

SUMMARY

In the conventional art, realization of a solid electrolyte material having high lithium ion conductivity is desired.

The solid electrolyte material according to one aspect of the present disclosure is represented by a composition formula $Li_aY_bM_cX_{6-d}F_d$, where
M includes at least one kind selected from the group consisting of metalloid elements and metal elements other than Li and Y;
X is at least one kind selected from the group consisting Cl, Br, and I;
$0<a$;
$0<b$;
$0 \leq c$; and
$0<d<6$.

According to the present disclosure, a solid electrolyte material having high lithium ion conductivity can be realized.

DETAILED DESCRIPTION OF THE EMBODIMENTS

Hereinafter, an embodiment of the present disclosure will be described with reference to the drawings.

First Embodiment

The solid electrolyte material in the first embodiment is a material represented by the following composition formula (1):

$$Li_aY_bM_cX_{6-d}F_d \qquad \text{Formula (1)}$$

where M includes at least one of metalloid elements and metal elements other than Li (lithium) and Y (yttrium).

X is one or more kinds of elements selected from the group consisting of Cl (chlorine), Br (bromine), and I (iodine).

In addition, the solid electrolyte material in the first embodiment satisfies the following conditions:
$0<a$;
$0<b$;
$0 \leq c$; and
$0<d<6$.

According to the above configuration, a solid electrolyte material having high lithium ion conductivity can be realized. In other words, fluorine is introduced into the halide solid electrolyte material to improve electrochemical stability, and high lithium ion conductivity can be maintained. On the other hand, in the configuration of Non-Patent Literature 1, the lithium ion conductivity is remarkably lowered by the introduction of fluorine.

In addition, according to the above configuration, by using the solid electrolyte material of the first embodiment, an all-solid secondary battery which does not include sulfur can be realized. In other words, the solid electrolyte material of the first embodiment does not have a configuration (for example, the configuration of Patent Literature 1) in which hydrogen sulfide is generated when exposed to the air. As a result, an all-solid secondary battery which does not generate hydrogen sulfide and is excellent in safety can be realized.

The term "metalloid element" refers to B, Si, Ge, As, Sb, and Te.

The term "metal element" refers to all elements included in Groups 1 to 12 of the periodic table except for hydrogen, and all elements included in Groups 13 to 16 of the periodic table except for all the metalloid elements, C, N, P, O, S, and Se. In other words, the metal element becomes a cation when the metal element forms an inorganic compound with a halogen.

M may be one or more kinds of elements selected from the group consisting of Mg, Ca, Sr, Ba, Zn, Sc, Al, Ga, Bi, Zr, Hf, Ti, Sn, Ta, and Nb.

According to the above configuration, the ion conductivity of the solid electrolyte material can be further improved.

In the composition formula (1),
$2 \leq a \leq 3.3$;
$0.6 \leq b \leq 1.33$;
$0 \leq c \leq 1$;
$1 \leq d \leq 3$; and
$a+3b+mc=6$ may be satisfied.

Here, m is a valence of M, and m=0 if c=0.

According to the above configuration, the ion conductivity of the solid electrolyte material can be further improved.

In the composition formula (1), c=0 may be satisfied.

In this case, $0.9 \leq b \leq 1.33$ may be satisfied.

According to the above configuration, the ion conductivity of the solid electrolyte material can be further improved.

In the composition formula (1), $0<c$ may be satisfied.

In this case, M may be one or more kinds of elements selected from the group consisting of Ca, Sr, Ba, Zr, and Al.

According to the above configuration, the ion conductivity of the solid electrolyte material can be further improved.

M may include Ca. For example, M may be Ca.

In this case, $0.05 \leq c \leq 1$ may be satisfied.

In this case, $0.6 \leq b \leq 1.17$ may be further satisfied.

According to the above configuration, the ion conductivity of the solid electrolyte material can be further improved.

M may include Sr. For example, M may be Sr.

In this case, $0.15 \leq c \leq 0.3$ may be satisfied.

In this case, $2.4 \leq a \leq 2.7$ may be further satisfied.

According to the above configuration, the ion conductivity of the solid electrolyte material can be further improved.

M may include Ba. For example, M may be Ba.

In this case, $0.15 \leq c \leq 0.6$ may be satisfied.

In this case, $0.8 \leq b \leq 1$ may be further satisfied.

According to the above configuration, the ion conductivity of the solid electrolyte material can be further improved.

M may include Al. For example, M may be Al.

In this case, $c=0.1$ and $b=0.9$ may be satisfied.

According to the above configuration, the ion conductivity of the solid electrolyte material can be further improved.

M may include Zr. For example, M may be Zr.

In this case, $0.15 \leq c \leq 0.3$ may be satisfied.

In this case, $0.7 \leq b \leq 0.85$ may be further satisfied.

According to the above configuration, the ion conductivity of the solid electrolyte material can be further improved.

The solid electrolyte material in the first embodiment may be crystalline or amorphous.

In addition, a shape of the solid electrolyte material in the first embodiment is not specifically limited, but may be, for example, an acicular shape, spherical shape, or elliptical spherical shape. For example, the solid electrolyte material in the first embodiment may be particles. A plurality of the particles are stacked, and then, the plurality of the particles may be formed into a pellet shape or a plate shape by pressurization.

For example, if the shape of the solid electrolyte material in the first embodiment is particulate (for example, spherical), the median diameter of the solid electrolyte material may be not less than 0.1 μm and not more than 100 μm.

In the first embodiment, the median diameter of the solid electrolyte material may be not less than 0.5 μm and not more than 10 μm.

According to the above configuration, ion conductivity can be further improved. In addition, a better dispersion state of the solid electrolyte material and an active material in the first embodiment can be formed.

In the first embodiment, the median diameter of the solid electrolyte material may be smaller than the median diameter of the active material.

According to the above configuration, a better dispersed state of the solid electrolyte material and the active material in the first embodiment can be formed.

<Manufacturing Method of Solid Electrolyte Material>

The solid electrolyte material in the first embodiment may be manufactured by the following method, for example.

Binary halide raw material powders are prepared so as to provide a blending ratio of a target composition. For example, if $Li_3YBr_5F_1$ is produced, $LiBr$, $YBr_3$, and $YF_3$ are prepared at a molar ratio of approximately 3:0.83:0.17. In consideration of a change in composition during a synthesis process, the blending ratio may be adjusted in advance so as to cancel the change. In this way, the above-described values "a", "b", "c", and "d" can be adjusted.

The raw material powders are mixed well, and then, the raw material powders are mixed and ground to react using a mechanochemical milling method. Subsequently, the reaction product may be sintered in a vacuum or inert atmosphere.

Alternatively, the raw material powders may be mixed well, and then sintered in a vacuum or in an inert atmosphere. It is preferable that the raw material powders is sintered, for example, within a range of 100° C. to 650° C. for one hour or longer.

Thereby, the solid electrolyte material including the composition as described above is provided.

Second Embodiment

Hereinafter, the second embodiment will be described. The description which has been set forth in the above-described first embodiment is omitted as appropriate.

The battery in the second embodiment is configured using the solid electrolyte material described in the first embodiment.

The battery in the second embodiment includes a solid electrolyte material, a positive electrode, a negative electrode, and an electrolyte layer.

The electrolyte layer is a layer provided between the positive electrode and the negative electrode.

At least one of the positive electrode, the electrolyte layer, and the negative electrode includes the solid electrolyte material in the first embodiment.

According to the above configuration, a battery using a solid electrolyte material having high lithium ion conductivity can be realized. Thereby, for example, a charge/discharge characteristic of the battery can be improved.

A specific example of the battery in the second embodiment will be described below.

Figure 1:
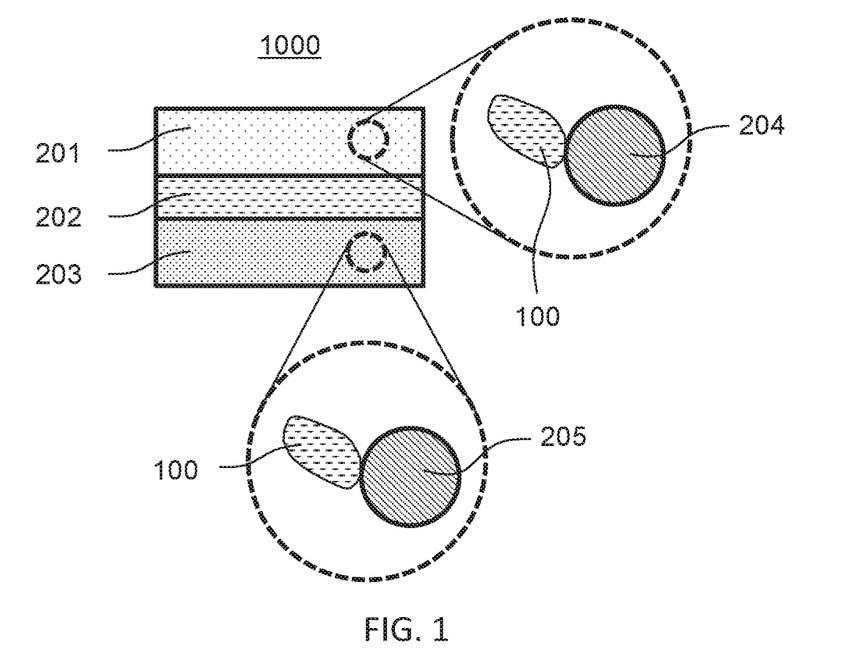
FIG. 1 is a cross-sectional view showing a schematic configuration of a battery 1000 in a second embodiment.

FIG. 1 is a cross-sectional view showing a schematic configuration of a battery 1000 in the second embodiment.

The battery 1000 in the second embodiment comprises a positive electrode 201, a negative electrode 203, and an electrolyte layer 202.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (for example, a solid electrolyte material).

The negative electrode 203 includes negative electrode active material particles 205 and solid electrolyte particles 100.

The solid electrolyte particles 100 are particles formed of the solid electrolyte material in the first embodiment or particles including the solid electrolyte material in the first embodiment as a main component.

The positive electrode 201 includes a material having a property of storing and releasing metal ions (for example, lithium ions). The positive electrode 201 includes, for example, a positive electrode active material (for example, the positive electrode active material particles 204).

Examples of the positive electrode active material include a lithium-containing transition metal oxide (e.g. $Li(NiCoAl)O_2$ or $LiCoO_2$), a transition metal fluoride, a polyanionic material, a fluorinated polyanionic material, a transition metal sulfide, a transition metal oxyfluoride, a transition metal oxysulfide, or a transition metal oxynitride.

The median diameter of the positive electrode active material particles 204 may be not less than 0.1 μm and not more than 100 μm. If the median diameter of the positive electrode active material particles 204 is less than 0.1 μm, there is a possibility that a good dispersion state of the positive electrode active material particles 204 and solid electrolyte particles 101 fails to be formed in the positive electrode. As a result, the charge/discharge characteristic of the battery is degraded. In addition, if the median diameter of the positive electrode active material particles 204 is more than 100 μm, lithium diffusion in the positive electrode active material particles 204 is made slow. As a result, it may be difficult to operate the battery at a high output.

The median diameter of the positive electrode active material particles 204 may be larger than the median diameter of the solid electrolyte particles 100. Thereby, a good dispersion state of the positive electrode active material particle 204 and the solid electrolyte particles 100 can be formed.

With regard to a volume ratio "v:100−v" between the positive electrode active material particles 204 and the solid electrolyte particles 100 included in the positive electrode 201, 30≤v≤95 may be satisfied. If v<30, it may be difficult to secure a sufficient energy density of the battery. In addition, if v>95, it may be difficult to operate at high output.

The thickness of the positive electrode 201 may be not less than 10 μm and not more than 500 μm. If the thickness of the positive electrode is less than 10 μm, it may be difficult to secure a sufficient energy density of the battery. If the thickness of the positive electrode is more than 500 μm, it may be difficult to operate at a high output.

The electrolyte layer 202 is a layer including an electrolyte material. The electrolyte material is, for example, a solid electrolyte material. In other words, the electrolyte layer 202 may be a solid electrolyte layer.

The electrolyte layer 202 may include the solid electrolyte material in the first embodiment as a main component. In other words, the electrolyte layer 202 may include the solid electrolyte material in the first embodiment, for example, at a weight ratio of not less than 50% (not less than 50% by weight) with respect to the entire electrolyte layer 202.

According to the above configuration, the charge/discharge characteristic of the battery can be further improved.

In addition, the electrolyte layer 202 may include the solid electrolyte material in the first embodiment, for example, at a weight ratio of not less than 70% (not less than 70% by weight) with respect to the entire electrolyte layer 202.

According to the above configuration, the charge/discharge characteristic of the battery can be further improved.

The electrolyte layer 202 may include the solid electrolyte material in the first embodiment as the main component thereof, and the electrolyte layer 202 may further include inevitable impurities. The electrolyte layer 202 may include the starting materials used for the synthesis of the solid electrolyte material in the first embodiment. The electrolyte layer 202 may include by-products or decomposition products generated when the solid electrolyte material in the first embodiment is synthesized.

In addition, the electrolyte layer 202 may include the solid electrolyte material in the first embodiment, for example, at a weight ratio of 100% (100% by weight) with respect to the entire solid electrolyte layer 202, except for the inevitable impurities.

According to the above configuration, the charge/discharge characteristic of the battery can be further improved.

As described above, the electrolyte layer 202 may be composed only of the solid electrolyte material in the first embodiment.

Alternatively, the electrolyte layer 202 may be composed only of a solid electrolyte material different from the solid electrolyte material in the first embodiment. As the solid electrolyte material different from the solid electrolyte material in the first embodiment, for example, $Li_2MgX_4$, $Li_2FeX_4$, $Li(Al,Ga,In)X_4$, $Li_3(Al,Ga,In)X_6$, or LiI (X: F, Cl, Br, I) may be used.

The solid electrolyte layer may simultaneously include the solid electrolyte material in the first embodiment and the solid electrolyte material different from the solid electrolyte material in the first embodiment. At this time, both may be dispersed uniformly. A layer formed of the solid electrolyte material in the first embodiment and a layer formed of the solid electrolyte material different from the solid electrolyte material in the first embodiment may be sequentially arranged in a stacking direction of the battery.

The thickness of the solid electrolyte layer may be not less than 1 μm and not more than 1,000 μm. If the thickness of the solid electrolyte layer is less than 1 μm, the possibility that the positive electrode 201 and the negative electrode 203 are short-circuited increases. In addition, if the thickness of the solid electrolyte layer is more than 1,000 μm, it may be difficult to operate at a high output.

The negative electrode 203 includes a material having a property of storing and releasing metal ions (for example, lithium ions). The negative electrode 203 includes, for example, a negative electrode active material (for example, the negative electrode active material particles 205).

A metal material, a carbon material, an oxide, a nitride, a tin compound, or a silicon compound may be used as the negative electrode active material. The metal material may be a single metal. Alternatively, the metal material may be an alloy. Examples of the metal material include lithium metal and a lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound may be preferably used. If a negative electrode active material having a low average reaction voltage is used, the effect of suppressing electrolysis by the solid electrolyte material in the first embodiment is better exhibited.

The median diameter of the negative electrode active material particles 205 may be not less than 0.1 μm and not more than 100 μm. If the median diameter of the negative electrode active material particles 205 is less than 0.1 μm, there is a possibility that a good dispersion state of the negative electrode active material particles 205 and the solid electrolyte particles 100 fails to be formed in the negative electrode. Thereby, the charge/discharge characteristic of the battery is lowered. On the other hand, if the median diameter of the negative electrode active material particles 205 is more than 100 μm, lithium diffusion in the negative electrode active material particles 205 is made slow. As a result, it may be difficult to operate the battery at a high output.

The median diameter of the negative electrode active material particles 205 may be larger than the median diameter of the solid electrolyte particles 100. Thereby, a good dispersion state of the negative electrode active material particles 205 and the solid electrolyte particles 100 can be formed.

With regard to a volume ratio "v:100−v" between the negative electrode active material particles 205 and the solid electrolyte particles 100 included in the negative electrode 203, 30≤v≤95 may be satisfied. If v<30, it may be difficult to secure a sufficient energy density of the battery. In addition, if v>95, it may be difficult to operate at high output.

The thickness of the negative electrode 203 may be not less than 10 μm and not more than 500 μm. If the thickness of the negative electrode is less than 10 μm, it may be difficult to secure a sufficient energy density of the battery. In addition, if the thickness of the negative electrode is more than 500 μm, it may be difficult to operate at a high output.

At least one of the positive electrode 201, the electrolyte layer 202, and the negative electrode 203 may include a sulfide solid electrolyte or an oxide solid electrolyte for the purpose of enhancing ion conductivity, chemical stability, or electrochemical stability. As the sulfide solid electrolyte, $Li_2S$—$P_2S$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_2$ may be used. As the oxide solid electrolyte, a NASICON solid electrolyte such as $LiTi_2(PO_4)_3$ and its element substitution products, a (LaLi)$TiO_3$ perovskite solid electrolyte, a LISICON solid electrolyte such as $Li_{14}ZnGe_4O_{16}$, $Li_4SiO_4$, $LiGeO_4$, and their element substitution products, a garnet solid electrolyte such as $Li_7La_3Zr_2O_{12}$ and its element substitution products, $Li_3N$ and its H substitution products, and $Li_3PO_4$ and its N substitution products may be used.

At least one of the positive electrode 201, the electrolyte layer 202, and the negative electrode 203 may include an organic polymer solid electrolyte for the purpose of increasing ion conductivity. As the organic polymer solid electrolyte, for example, a compound of a polymer compound and a lithium salt may be used. The polymer compound may have an ethylene oxide structure. Due to the ethylene oxide structure, a large amount of lithium salt may be included to further increase the ion conductivity. As the lithium salt, $LiPF_6$, $LiBF_4$, LibFe, $LiAsF_6$, $LiSO_3CF_3$, $LN(SO_2CF_3)_2$, $LN(SO_2C_2F_5)_2$, $LiN(SO_2CF_3)(SO_2C_4F_9)$, or $LiC(SO_2CF_3)_3$ may be used. As the lithium salt, one kind of lithium salt selected from these may be used alone. Alternatively, a mixture of two or more kinds of lithium salts selected from these may be used as the lithium salt.

At least one of the positive electrode 201, the electrolyte layer 202, and the negative electrode 203 may include a non-aqueous electrolyte solution, a gel electrolyte, or an ionic liquid for the purpose of facilitating the exchange of lithium ions and improving the output characteristic of the battery.

The non-aqueous electrolyte solution includes a non-aqueous solvent and a lithium salt which has been dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent may be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the non-aqueous solvent, one kind of non-aqueous solvent selected from these may be used alone. Alternatively, a combination of two or more kinds of non-aqueous solvents selected from these may be used as the non-aqueous solvent. The non-aqueous electrolyte solution may include at least one kind of fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ may be used. As the lithium salt, one kind of lithium salt selected from these may be used alone. Alternatively, a mixture of two or more kinds of lithium salts selected from these may be used as the lithium salt. The concentration of the lithium salt is, for example, within the range of 0.5 to 2 mol/liter.

As the gel electrolyte, a polymer material including the non-aqueous electrolyte solution can be used. As the polymer material, polyethylene oxide, polyacrylonitrile, polyvinylidene fluoride, polymethyl methacrylate, or a polymer having an ethylene oxide bond may be used.

The cation forming the ionic liquid may be:

an aliphatic chain quaternary salt such as tetraalkylammonium or tetraalkylphosphonium, an aliphatic cyclic ammonium such as pyrrolidinium, morpholinium, imidazolinium, tetrahydropyrimidinium, piperazinium, or piperidinium; or a nitrogen-containing heterocyclic aromatic cation such as pyridinium or imidazolium.

The anion forming the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may include a lithium salt.

At least one of the positive electrode 201, the electrolyte layer 202, and the negative electrode 203 may include a binder for the purpose of improving the adhesion between the particles. The binder is used to improve the binding property of the material forming the electrode. Examples of the binder include polyvinylidene fluoride, polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, and carboxymethylcellulose. As the binder, a copolymer of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. In addition, two or more kinds of selected from these may be mixed and used as the binder.

In addition, at least one of the positive electrode 201 and the negative electrode 203 may include a conductive agent as necessary.

The conductive agent is used to lower electrode resistance. Examples of the conductive agent include graphite such as natural graphite or artificial graphite; carbon black such as acetylene black or ketjen black; a conductive fiber such as a carbon fiber or a metal fiber; carbon fluoride; a metal powder such as aluminum; a conductive whisker such as zinc oxide or potassium titanate; a conductive metal oxide such as titanium oxide; or a conductive polymer compound such as polyaniline, polypyrrole, or polythiophene. Cost reduction can be achieved by using a carbon conductive agent as the conductive agent.

An example of the shape of the battery in the third embodiment may be a coin, a cylinder, a prism, a sheet, a button, a flat type, or a stacking structure.

EXAMPLES

Hereinafter, details of the present disclosure will be described with reference to inventive examples and comparative example.

Inventive Example 1

[Production of Solid Electrolyte Material]

In an argon atmosphere with a dew point of −60° C. or less, raw material powders LiBr, YBr$_3$, and YF$_3$ were prepared at a molar ratio of LiBr:YBra:YF$_3$=3:0.83:0.17. These were ground and mixed in a mortar. Subsequently, milling processing was performed at 500 rpm for 12 hours using a planetary ball mill.

Thus, a powder of the solid electrolyte material of the inventive example 1 represented by the composition formula of Li$_3$YBr$_5$F was provided.

[Evaluation of Ion Conductivity]

Figure 2:
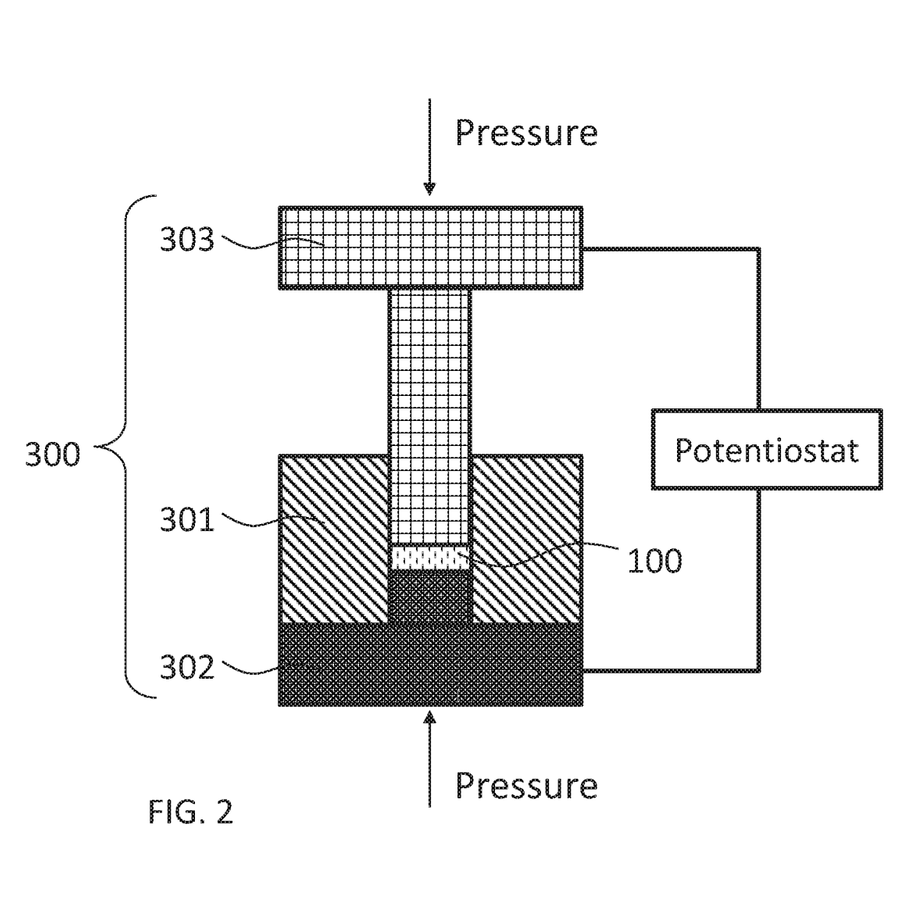
FIG. 2 is a schematic view showing an evaluation method of ion conductivity.

FIG. 2 is a schematic diagram showing an evaluation method of ion conductivity.

A pressure-molding die 300 is composed of a frame 301 formed of an electronically insulating polycarbonate, and an upper punch part 303 and a lower punch part 302, both of which are formed of electron conductive stainless steel.

Ion conductivity was evaluated by the following method using the configuration shown in FIG. 2.

In a dry atmosphere with a dew point of −30° C. or lower, the inside of the pressure-molding die 300 was filled with the powder of the solid electrolyte material of the inventive example 1, and was uniaxially pressed at 400 MPa to produce a conductivity measurement cell of the inventive example 1.

In a pressurized state, lead wires were routed from the upper punch part 303 and the lower punch part 302 and were connected to a potentiostat (Princeton Applied Research, VersaSTAT 4) equipped with a frequency response analyzer. The ion conductivity at room temperature was measured by an electrochemical impedance measurement method.

Figure 3:
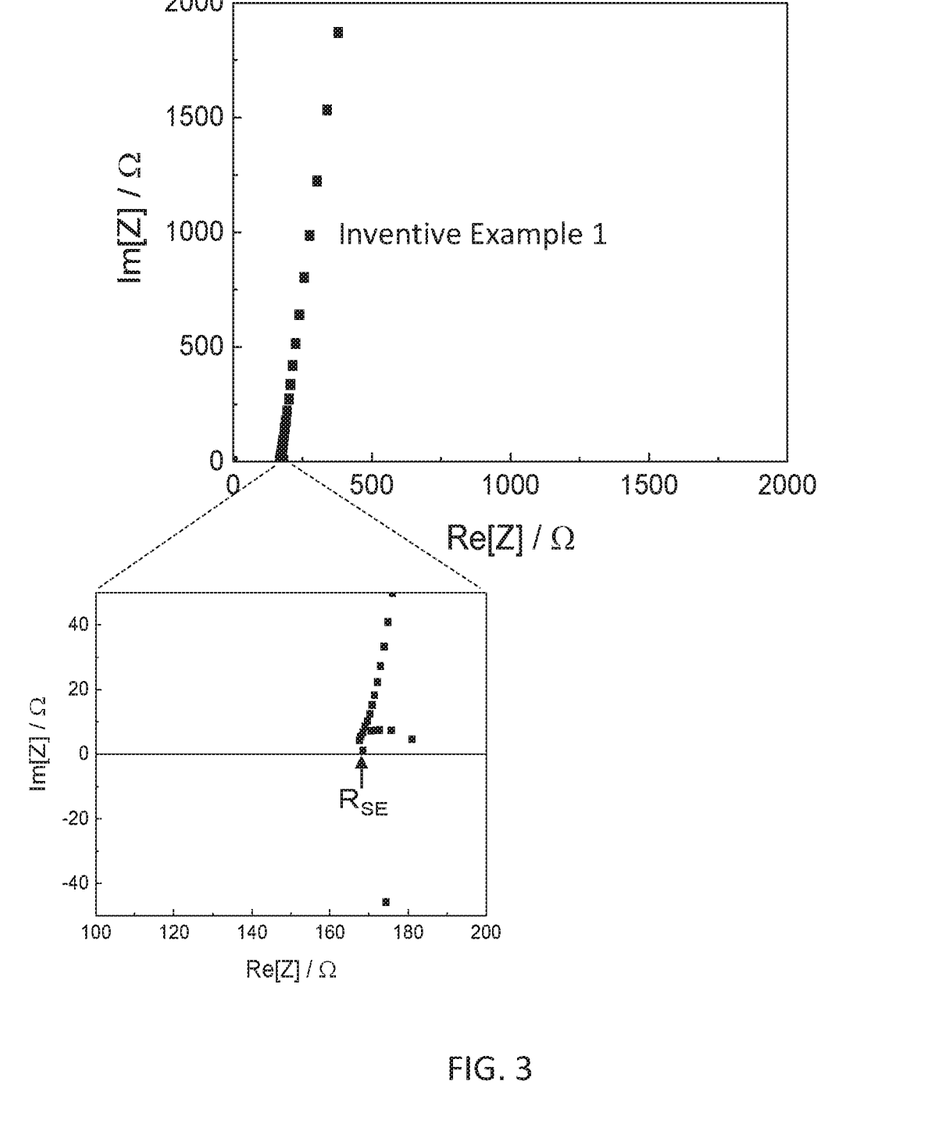
FIG. 3 is a graph showing an evaluation result of ion conductivity by an AC impedance measurement.

FIG. 3 shows a Cole-Cole diagram of the results of the impedance measurement.

In FIG. 3, a real value of the impedance at the measurement point (arrow in FIG. 3) having the smallest absolute value of the phase of the complex impedance was deemed to be the resistance value for the ion conduction of the solid electrolyte of the inventive example 1.

The ion conductivity was calculated from the following formula (2) using the resistance value of the electrolyte.

$$\sigma = (R_{SE} \times S/t)^{-1} \quad (2)$$

where σ is ion conductivity, S is an electrolyte area (inner diameter of the frame 301 in FIG. 2), R is the resistance value of the solid electrolyte in the above-mentioned impedance measurement, and t is a thickness of the electrolyte (in FIG. 2, the thickness of the compressed body of the plurality of the solid electrolyte particles 100).

The ion conductivity of the solid electrolyte material of the inventive example 1 measured at 22° C. was 2.58×10$^{-4}$ S/cm.

Inventive Examples 2 to 63

Hereinafter, synthesis and evaluation methods of Li$_a$Y$_b$M$_c$X$_{6-d}$F$_d$ will be described.

[Production of Solid Electrolyte Material]

In the inventive examples 2 to 63, raw material powders were prepared in a glove box maintained in a dry/low oxygen atmosphere having a dew point of −90° C. or lower and an oxygen value of 5 ppm or lower.

In the inventive examples 2 to 4, raw material powders LiBr, YBr$_3$, and YF$_3$ were prepared at a the molar ratio of LiBr:YBr$_3$:YF$_3$=a:(3−d)/3:d/3.

In the inventive example 5, raw material powders LiCl, YCl$_3$, and YF$_3$ were prepared at a molar ratio of LiCl:YCl$_3$:YF$_3$=3:0.33:0.67.

In the inventive example 6, raw material powders LiI and YF$_3$ were prepared at a molar ratio of LiI:YF$_3$=1:1.

In the inventive example 7, raw material powders LiI, LiBr, YBr$_3$, and YF$_3$ were prepared at a molar ratio of LiI:LiBr:YBr$_3$:YF$_3$=0.5:2.5:0.33:067.

In the inventive example 8, raw material powders LiI, LiBr, and YF$_3$ were prepared at a molar ratio of LiI:LiBr:YF$_3$=1:2:1.

In the inventive examples 9 to 17, raw material powders LiI, LiBr, YBr$_3$, and YF$_3$ were prepared at a molar ratio of LiI:LiBr:YBr$_3$:YF$_3$=2:a−2:c−d/3:d/3.

In the inventive examples 18 and 19, raw material powders LiI, LiBr, YBr$_3$, and YF$_3$ were prepared at a molar ratio of LiI:LiBr:YBr$_3$:YF$_3$=2.5:a−2.5:c−d/3:d/3.

In the inventive example 20, raw material powders LiI, YBr$_3$, and YF$_3$ were prepared at a molar ratio of LiI:YBr$_3$:YF$_3$=1:0.5:0.5.

In the inventive example 21, raw material powders LiBr, LiCl, YCl$_3$, and YF$_3$ were prepared at a molar ratio of LiBr:LiCl:YCl$_3$:YF$_3$=2:1:0.33:0.67.

In the inventive example 22, raw material powders LiBr, YCl$_3$, and YF$_3$ were prepared at a molar ratio of LiBr:YCl$_3$:YF$_3$=3:0.5:0.5.

In the inventive example 23, raw material powders LiI, LiCl, YCl$_3$, and YF$_3$ were prepared at a molar ratio of LiI:LiCl:YCl$_3$:YF$_3$=2:1:0.33:0.67.

In the inventive example 24, raw material powders LiI, LiBr, YBr$_3$, YF$_3$, and CaBr$_2$ were prepared at a molar ratio of LiI:LiBr:YBr$_3$:YF$_3$:CaBr$_2$=0.5:2:0.13:0.67:0.55.

In the inventive example 25, raw material powders LiI, LiBr, YBr$_3$, YF$_3$, and CaBr$_2$ were prepared at a molar ratio of LiI:LiBr:YBr$_3$:YF$_3$:CaBr$_2$=1:1.25:0.08:0.67:0.75.

In the inventive examples 26 to 47, raw material powders LiI, LiBr, YBr$_3$, YF$_3$, and MBr$_2$ were prepared at a molar ratio of LiI:LiBr:YBr$_3$:YF$_3$:MBr$_2$=2:a−2:b−0.67:0.67:c.

In the inventive example 48, raw material powders LiI, LiBr, YBr$_3$, YF$_3$, and CaBr$_2$ were prepared at a molar ratio of LiI:LiBr:YBr$_3$:YF$_3$:CaBr$_2$=2.1:0.3:0.2:06:06.

In the inventive example 49, raw material powders LiI, LiBr, YBr$_3$, YF$_3$, and CaBr$_2$ were prepared at a molar ratio of LiI:LiBr:YBr$_3$:YF$_3$:CaBr$_2$=2.15:0.25:0.23:0.57:0.6.

In the inventive examples 50 and 51, raw material powders LiI, LiBr, YBr$_3$, YF$_3$, and CaBr$_2$ were prepared at a molar ratio of LiI:LiBr:YBr$_3$:YF$_3$:CaBr$_2$=2.2:a−2.2:b−d/3:d/3:c.

In the inventive examples 52 and 53, raw material powders LiI, LiBr, YBr$_3$, YF$_3$, and CaBr$_2$ were prepared at a molar ratio of LiI:LiBr:YBr$_3$:YF$_3$:CaBr$_2$=2.25:a−2.25:b−d/3:d/3:c.

In the inventive example 54, raw material powders LiI, YBr$_3$, YF$_3$, and CaBr$_2$ were prepared at a molar ratio of LiI:YBr$_3$:YF$_3$:CaBr$_2$=2.5:0.25:05:0.625.

In the inventive examples 55 and 56, raw material powders LiI, LiCl, YCl$_3$, YF$_3$, and CaCl$_2$ were prepared at a molar ratio of LiI:LiCl:YCl$_3$:YF$_3$:CaCl$_2$=2:0.4:b−0.67:0.67:c.

In the inventive example 57, raw material powders LiI, YCl$_3$, YF$_3$, and CaCl$_2$) were prepared at a molar ratio of LiI:YCl$_3$:YF$_3$:CaCl$_2$=2.4:0.13:0.67:0.6.

In the inventive example 58, raw material powders LiCl, LiBr, YBr$_3$, YF$_3$, and CaBr$_2$ were mixed at a molar ratio of LiCl:LiBr:YBr$_3$:YF$_3$:CaBr$_2$=2:0.4:0.13:0.67:0.6.

In the inventive example 59, raw material powders LiCl, YBr$_3$, YF$_3$, and CaBr$_2$ were prepared at a molar ratio of LiCl:YBr$_3$:YF$_3$:CaBr$_2$=2.4:0.13:0.67:0.6.

In the inventive example 60, raw material powders LiI, LiCl, YCl$_3$, YF$_3$, and CaBr$_2$ were mixed at a molar ratio of LiI:LiC:YCl$_3$:YF$_3$:CaBr$_2$=2:0.4013:0.67:0.6.

In the inventive example 61, raw material powders LiBr, LiF, YBr$_3$, YCl$_3$, and AlCl$_3$ were prepared at a molar ratio of LiBr:LiF:YBr$_3$:YCl$_3$:AlCl$_3$=2:1:0.33:0.57:0.1.

In the inventive examples 62 and 63, raw material powders LiBr, LiF, YBr$_3$, YCl$_3$, and ZrCl$_4$ were prepared at a molar ratio of LiBr:LiF:YBr$_3$:YCl$_3$:ZrCl$_4$=2:1:0.33:(2−4c)/3:c.

The values "a", "b", "c", and "d" and the element "M" in each of the inventive examples 2 to 63 are listed in Table 1, which will be shown later.

The solid electrolyte materials of the inventive examples 2 to 63 were produced in the same manner as in the inventive example 1.

[Evaluation of Ion Conductivity]

In a glove box maintained in a dry/low oxygen atmosphere with a dew point of −90° C. or less and an oxygen value of 5 ppm or less, a conductivity measurement cell of each of the inventive examples 2 to 63 was produced in the same manner as in the inventive example 1.

Except for this, ion conductivity was measured in the same manner as in the inventive example 1.

The ion conductivities in the inventive examples to 63 are listed in Table 1 which will be described later.

Table 1 shows the configurations and evaluation results in the inventive examples 1 to 63, and the compositions and conductivities described in Non-Patent Literature 1 (namely, the comparative examples 1 and 2).

TABLE 1

| Inventive Example Number | Composition | a | b | c | d | X | M | Conductivity [S/cm] |
|---|---|---|---|---|---|---|---|---|
| 1 | Li$_3$YBr$_5$F | 3 | 1 | 0 | 1 | Br | | 2.58E−04 |
| 2 | Li$_3$YBr$_{4.5}$F$_{1.5}$ | 3 | 1 | 0 | 1.5 | Br | | 1.47E−04 |
| 3 | Li$_3$YBr$_4$F$_2$ | 3 | 1 | 0 | 2 | Br | | 3.99E−05 |
| 4 | Li$_3$YBr$_3$F$_3$ | 3 | 1 | 0 | 3 | Br | | 3.68E−07 |
| 5 | Li$_3$YCl$_4$F$_2$ | 3 | 1 | 0 | 2 | Cl | | 2.78E−07 |
| 6 | Li$_3$I$_3$F$_3$ | 3 | 1 | 0 | 3 | I | | 6.14E−06 |
| 7 | Li$_3$YBr$_{3.5}$I$_{0.5}$F$_2$ | 3 | 1 | 0 | 2 | Br, I | | 9.75E−05 |
| 8 | Li$_3$YBr$_2$IF$_3$ | 3 | 1 | 0 | 3 | Br, I | | 3.09E−06 |
| 9 | Li$_3$YBr$_2$I$_2$F$_2$ | 3 | 1 | 0 | 2 | Br, I | | 7.43E−05 |
| 10 | Li$_3$YBr$_{1.5}$I$_2$F$_{2.5}$ | 3 | 1 | 0 | 2.5 | Br, I | | 3.10E−05 |
| 11 | Li$_3$YBrI$_2$F$_3$ | 3 | 1 | 0 | 3 | Br, I | | 4.81E−06 |
| 12 | Li$_{3.3}$Y$_{0.9}$Br$_2$I$_2$F$_2$ | 3.3 | 0.9 | 0 | 2 | Br, I | | 5.77E−05 |
| 13 | Li$_{2.7}$Y$_{1.1}$Br$_2$I$_2$F$_2$ | 2.7 | 1.1 | 0 | 2 | Br, I | | 1.81E−04 |
| 14 | Li$_{2.55}$Y$_{1.15}$Br$_2$I$_2$F$_2$ | 2.55 | 1.15 | 0 | 2 | Br, I | | 3.43E−04 |
| 15 | Li$_{2.4}$Y$_{1.2}$Br$_2$I$_2$F$_2$ | 2.4 | 1.2 | 0 | 2 | Br, I | | 4.85E−04 |
| 16 | Li$_{2.25}$Y$_{1.25}$Br$_2$I$_2$F$_2$ | 2.25 | 1.25 | 0 | 2 | Br, I | | 4.18E−04 |
| 17 | Li$_2$Y$_{1.33}$Br$_2$I$_2$F$_2$ | 2 | 1.33 | 0 | 2 | Br, I | | 5.77E−05 |
| 18 | Li$_3$YBrI$_{2.5}$F$_{1.5}$ | 3 | 1 | 0 | 1.5 | Br, I | | 4.08E−04 |
| 19 | Li$_3$YBr$_1$I$_{2.5}$F$_{2.5}$ | 3 | 1 | 0 | 2.5 | Br, I | | 3.06E−05 |
| 20 | Li$_3$YBr$_{1.5}$I$_3$F$_{1.5}$ | 3 | 1 | 0 | 1.5 | Br, I | | 3.66E−04 |
| 21 | Li$_3$YCl$_2$Br$_2$F$_2$ | 3 | 1 | 0 | 2 | Cl, Br | | 6.69E−05 |
| 22 | Li$_3$YCl$_{1.5}$Br$_3$F$_{1.5}$ | 3 | 1 | 0 | 1.5 | Cl, Br | | 1.19E−04 |
| 23 | Li$_3$YCl$_2$I$_2$F$_2$ | 3 | 1 | 0 | 3 | Cl, I | | 7.61E−05 |
| 24 | Li$_{2.5}$Y$_{0.8}$Ca$_{0.55}$Br$_{3.5}$I$_{0.5}$F$_2$ | 2.5 | 0.8 | 0.55 | 2 | Br, I | Ca | 1.77E−05 |
| 25 | Li$_{2.25}$Y$_{0.75}$Ca$_{0.75}$Br$_3$I$_1$F$_2$ | 2.25 | 0.75 | 0.75 | 2 | Br, I | Ca | 1.03E−05 |
| 26 | Li$_{3.05}$Y$_{0.95}$Ca$_{0.05}$Br$_2$I$_2$F$_2$ | 3.05 | 0.95 | 0.05 | 2 | Br, I | Ca | 1.20E−04 |
| 27 | Li$_{3.1}$Y$_{0.9}$Ca$_{0.1}$Br$_2$I$_2$F$_2$ | 3.1 | 0.9 | 0.1 | 2 | Br, I | Ca | 9.11E−05 |
| 28 | Li$_{2.7}$YCa$_{0.15}$Br$_2$I$_2$F$_2$ | 2.7 | 1 | 0.15 | 2 | Br, I | Ca | 1.51E−04 |
| 29 | Li$_{2.55}$YCa$_{0.225}$Br$_2$I$_2$F$_2$ | 2.55 | 1 | 0.225 | 2 | Br, I | Ca | 1.57E−04 |
| 30 | Li$_{2.4}$YCa$_{0.3}$Br$_2$I$_2$F$_2$ | 2.4 | 1 | 0.3 | 2 | Br, I | Ca | 2.01E−04 |
| 31 | Li$_2$YCa$_{0.5}$Br$_2$I$_2$F$_2$ | 2 | 1 | 0.5 | 2 | Br, I | Ca | 2.03E−04 |
| 32 | Li$_{2.4}$Y$_{1.17}$Ca$_{0.05}$Br$_2$I$_2$F$_2$ | 2.4 | 1.17 | 0.05 | 2 | Br, I | Ca | 3.16E−04 |
| 33 | Li$_{2.4}$Y$_{1.13}$Ca$_{0.1}$Br$_2$I$_2$F$_2$ | 2.4 | 1.13 | 0.1 | 2 | Br, I | Ca | 3.32E−04 |
| 34 | Li$_{2.4}$Y$_{0.9}$Ca$_{0.45}$Br$_2$I$_2$F$_2$ | 2.4 | 0.9 | 0.45 | 2 | Br, I | Ca | 1.70E−04 |
| 35 | Li$_{2.4}$Y$_{0.8}$Ca$_{0.6}$Br$_2$I$_2$F$_2$ | 2.4 | 0.8 | 0.6 | 2 | Br, I | Ca | 1.01E−04 |
| 36 | Li$_{2.25}$Y$_{0.75}$Ca$_{0.75}$Br$_2$I$_2$F$_2$ | 2.25 | 0.75 | 0.75 | 2 | Br, I | Ca | 5.80E−05 |
| 37 | Li$_{2.25}$Y$_{0.67}$Ca$_{0.87}$Br$_2$I$_2$F$_2$ | 2.25 | 0.67 | 0.87 | 2 | Br, I | Ca | 3.69E−05 |
| 38 | Li$_{2.3}$Y$_{0.8}$Ca$_{0.65}$Br$_2$I$_2$F$_2$ | 2.3 | 0.8 | 0.65 | 2 | Br, I | Ca | 1.36E−04 |
| 39 | Li$_2$Y$_{0.8}$Ca$_{0.8}$Br$_2$I$_2$F$_2$ | 2 | 0.8 | 0.8 | 2 | Br, I | Ca | 1.22E−04 |
| 40 | Li$_{2.8}$Y$_{0.8}$Ca$_{0.4}$Br$_2$I$_2$F$_2$ | 2.8 | 0.8 | 0.4 | 2 | Br, I | Ca | 8.71E−05 |
| 41 | Li$_{2.4}$Y$_{0.83}$Ca$_{0.55}$Br$_2$I$_2$F$_2$ | 2.4 | 0.83 | 0.55 | 2 | Br, I | Ca | 1.18E−04 |
| 42 | Li$_{2.7}$YSr$_{0.15}$Br$_2$I$_2$F$_2$ | 2.7 | 1 | 0.15 | 2 | Br, I | Sr | 1.19E−04 |
| 43 | Li$_{2.4}$YSr$_{0.3}$Br$_2$I$_2$F$_2$ | 2.4 | 1 | 0.3 | 2 | Br, I | Sr | 6.36E−05 |
| 44 | Li$_{2.7}$YBa$_{0.15}$Br$_2$I$_2$F$_2$ | 2.7 | 1 | 0.15 | 2 | Br, I | Ba | 9.35E−05 |
| 45 | Li$_{2.4}$YBa$_{0.3}$Br$_2$I$_2$F$_2$ | 2.4 | 1 | 0.3 | 2 | Br, I | Ba | 1.33E−04 |
| 46 | Li$_{2.0}$YBa$_{0.5}$Br$_2$I$_2$F$_2$ | 2 | 1 | 0.5 | 2 | Br, I | Ba | 1.14E−04 |
| 47 | Li$_{2.4}$Y$_{0.8}$Ba$_{0.6}$Br$_2$I$_2$F$_2$ | 2.4 | 0.8 | 0.6 | 2 | Br, I | Ba | 1.41E−05 |
| 48 | Li$_{2.4}$Y$_{0.8}$Ca$_{0.6}$Br$_{2.1}$I$_{2.1}$F$_{1.8}$ | 2.4 | 0.8 | 0.6 | 1.8 | Br, I | Ca | 1.94E−04 |
| 49 | Li$_{2.4}$Y$_{0.8}$Ca$_{0.6}$Br$_{2.15}$I$_{2.15}$F$_{1.7}$ | 2.4 | 0.8 | 0.6 | 1.7 | Br, I | Ca | 1.89E−04 |
| 50 | Li$_{2.3}$Y$_{0.8}$Ca$_{0.65}$Br$_{2.2}$I$_{2.2}$F$_{1.6}$ | 2.3 | 0.8 | 0.65 | 1.6 | Br, I | Ca | 3.26E−04 |
| 51 | Li$_{2.2}$Y$_{0.6}$Ca$_1$Br$_{2.3}$I$_{2.2}$F$_{1.5}$ | 2.2 | 0.6 | 1 | 1.5 | Br, I | Ca | 8.67E−05 |
| 52 | Li$_{2.25}$Y$_{0.75}$Ca$_{0.75}$Br$_{1.75}$I$_{2.25}$F$_2$ | 2.25 | 0.75 | 0.75 | 2 | Br, I | Ca | 6.62E−05 |

TABLE 1-continued

| Inventive Example Number | Composition | a | b | c | d | X | M | Conductivity [S/cm] |
|---|---|---|---|---|---|---|---|---|
| 53 | $Li_{2.25}Y_{0.67}Ca_{0.87}Br_{1.75}I_{2.25}F_2$ | 2.25 | 0.67 | 0.87 | 2 | Br, I | Ca | 2.55E−05 |
| 54 | $Li_{2.5}Y_{0.75}Ca_{0.625}Br_2I_{2.5}F_{1.5}$ | 2.5 | 0.75 | 0.625 | 1.5 | Br, I | Ca | 2.08E−04 |
| 55 | $Li_{2.4}Y_{0.8}Ca_{0.6}Cl_2I_2F_2$ | 2.4 | 0.8 | 0.6 | 2 | Cl, I | Ca | 1.96E−05 |
| 56 | $Li_{2.4}YCa_{0.3}Cl_2I_2F_2$ | 2.4 | 1 | 0.3 | 2 | Cl, I | Ca | 9.08E−05 |
| 57 | $Li_{2.4}Y_{0.8}Ca_{0.6}Cl_{1.6}I_{2.4}F_2$ | 2.4 | 0.8 | 0.6 | 2 | Cl, I | Ca | 2.84E−05 |
| 58 | $Li_{2.4}Y_{0.8}Ca_{0.6}Cl_2Br_2F_2$ | 2.4 | 0.8 | 0.6 | 2 | Cl, Br | Ca | 6.65E−07 |
| 59 | $Li_{2.4}Y_{0.8}Ca_{0.6}Cl_{2.4}Br_{1.6}F_2$ | 2.4 | 0.8 | 0.6 | 2 | Cl, Br | Ca | 3.21E−07 |
| 60 | $Li_{2.4}Y_{0.8}Ca_{0.6}Cl_{0.8}Br_{1.2}F_2$ | 2.4 | 0.8 | 0.6 | 2 | Cl, Br, I | Ca | 9.22E−05 |
| 61 | $Li_3Y_{0.9}Al_{0.1}Cl_2Br_3F_1$ | 3 | 0.9 | 0.1 | 1 | Cl, Br | Al | 2.29E−04 |
| 62 | $Li_{2.85}Y_{0.85}Zr_{0.15}Cl_2Br_3F_1$ | 2.85 | 0.85 | 0.15 | 1 | Cl, Br | Zr | 2.53E−04 |
| 63 | $Li_{2.7}Y_{0.7}Zr_{0.3}Cl_2Br_3F_1$ | 2.7 | 0.7 | 0.3 | 1 | Cl, Br | Zr | 1.96E−04 |
| C.E. 1 | $Li_3InBr_3F_3$ | | | | | | | 2.00E−07 |
| C.E. 2 | $Li_3InBr_5F$ | | | | | | | 3.00E−08 |

C.E. means comparative example

[Production of Secondary Battery]

In an argon glove box, the solid electrolyte material of the inventive example 35 and graphite, which was an active material, were prepared at a volume ratio of 50:50. These were mixed in an agate mortar to prepare a mixture.

In the insulating outer cylinder, $Li_3PS_4$ which corresponded to a thickness of 700 μm and 13.3 mg of the above-mentioned mixture were stacked in this order. This was pressure-molded at a pressure of 300 MPa to provide a first electrode and a solid electrolyte layer.

Next, a metal In (thickness: 200 μm), a metal Li (thickness: 300 μm), and a metal In (thickness: 200 μm) were stacked in this order at a volume ratio of 1.1:1:1.1 on the surface opposite to the surface which was in contact with the first electrode of the solid electrolyte layer. This was pressure-molded at a pressure of 80 MPa to produce a stacking structure composed of the first electrode, the solid electrolyte layer, and a second electrode.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere.

In this way, the secondary battery of the inventive example 35 was produced.

[Charge/Discharge Test]

Figure 4:
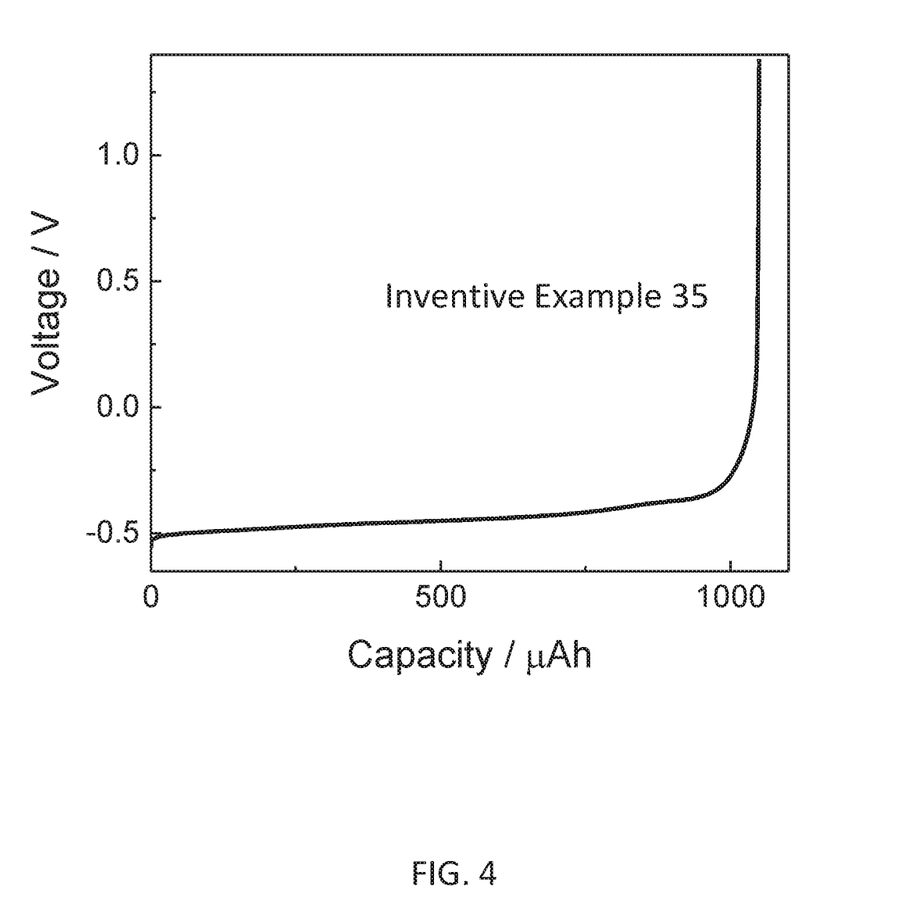
FIG. 4 is a graph showing an initial discharge characteristic.

FIG. 4 is a graph showing an initial discharge characteristic.

The results shown in FIG. 4 were measured by the following method.

In other words, the secondary battery of the inventive example 35 was placed in a thermostatic chamber at 25° C.

The battery was charged with a constant current at a current value of 0.05 C rate (20 hour rate) with respect to the theoretical capacity of the battery. The charge was terminated at a voltage of −0.62 V.

Next, the battery was discharged at a current value of 0.05 C rate. The discharge was terminated at a voltage of 1.38 V. As used herein, the charge means that a reaction in which Li is inserted into graphite proceeds, and the discharge means that a reaction in which Li is released from the graphite proceeds.

As a result of the above measurement, the initial discharge capacity of the secondary battery of the inventive example 35 was 1,005 μAh.

Discussion

It can be seen that higher ion conductivity of not less than $2.5 \times 10^{-7}$ S/cm near room temperature was exhibited in the inventive examples 1 to 63 than in the comparative examples 1 and 2. On the other hand, in the halide solid electrolyte of Non-Patent Literature 1, low ion conductivity of no more than approximately $2 \times 10^{-7}$ S/cm has been confirmed at room temperature.

In particular, if a value of a substitution amount c of M, which has been defined by the formula (1), is within a range of $0 \leq c \leq 1.0$, higher ion conductivity is exhibited. In particular, higher ion conductivity is exhibited if M=Ca and the range is $0.01 \leq c \leq 1.0$, if M=Sr and the range is $0.01 \leq c \leq 0.3$, if M=Ba and the range is $0.01 \leq c \leq 0.6$, if M=Al and the range is $0.01 \leq c \leq 0.1$, and if M=Zr and the range is $0.01 \leq c \leq 03$.

Furthermore, since the materials of the inventive examples 1 to 63 do not include sulfur as a constituent element, hydrogen sulfide is not generated.

As described above, it is proved that the solid electrolyte material according to the present disclosure is an electrolyte material that does not generate hydrogen sulfide and has high lithium ion conductivity.

INDUSTRIAL APPLICABILITY

The battery of the present disclosure can be used as, for example, an all-solid lithium secondary battery.

REFERENTIAL SIGNS LIST

100 Solid electrolyte particles
201 Positive electrode
202 Electrolyte layer
203 Negative electrode
204 Positive electrode active material particles
205 Negative electrode active material particles
300 Pressure-molding die
301 Frame
302 Lower punch part
303 Upper punch part
1000 Battery

The invention claimed is:

1. A solid electrolyte material represented by a composition formula $Li_aY_bM_cX_{6-d}F_d$, where
M includes at least one kind selected from the group consisting of metalloid elements and metal elements other than Li and Y;

X is at least one kind selected from the group consisting of Cl, Br, and I;
0<a;
0<b;
0≤c; and
0<d<6.

2. The solid electrolyte material according to claim 1, wherein
2≤a≤3.3;
0.6≤b≤1.33;
0≤c≤1;
1≤d≤3; and
a+3b+mc=6 are satisfied,
where
m is a valence of M; and
m=0 in a case where c=0.

3. The solid electrolyte material according to claim 1, wherein
c=0 is satisfied.

4. The solid electrolyte material according to claim 3, wherein
0.9≤b≤1.33 is satisfied.

5. The solid electrolyte material according to claim 1, wherein
0<c is satisfied; and
M is at least one kind selected from the group consisting of Ca, Sr, Ba, Zr, and Al.

6. The solid electrolyte material according to claim 5, wherein
M includes Ca; and
0.05≤c≤1 is satisfied.

7. The solid electrolyte material according to claim 6, wherein
0.6≤b≤1.17 is satisfied.

8. The solid electrolyte material according to claim 5, wherein
M includes Sr; and
0.15≤c≤0.3 is satisfied.

9. The solid electrolyte material according to claim 8, wherein
2.4≤a≤2.7 is satisfied.

10. The solid electrolyte material according to claim 5, wherein
M includes Ba; and
0.15≤c≤0.6 is satisfied.

11. The solid electrolyte material according to claim 10, wherein
0.8≤b≤1 is satisfied.

12. The solid electrolyte material according to claim 5, wherein
M includes Al; and
c=0.1 and b=0.9 are satisfied.

13. The solid electrolyte material according to claim 5, wherein
M includes Zr; and
0.15≤c≤0.3 is satisfied.

14. The solid electrolyte material according to claim 13, wherein
0.7≤b≤0.85 is satisfied.

15. A battery, comprising:
the solid electrolyte material according to claim 1;
a positive electrode;
a negative electrode; and
an electrolyte layer disposed between the positive electrode and the negative electrode,
wherein
at least one selected from the group consisting of the positive electrode, the negative electrode, and the electrolyte layer includes the solid electrolyte material.

16. The solid electrolyte material according to claim 1, wherein
0<c is satisfied, and
M is at least one kind selected from the group consisting of Mg, Ca, Sr, Ba, Zn, Sc, Al, Ga, Bi, Zr, Hf, Ti, Sn, Ta, Nb, B, Si, Ge, As, Sb, and Te.

* * * * *